No. 661,287.  
C. C. CRAGO.  
GUARD FOR SHOVELS.  
(Application filed May 15, 1900.)  
Patented Nov. 6, 1900.

(No Model.)

Witnesses  
F. E. Alden.  
N. F. Riley.

C. C. Crago, Inventor  
by C. A. Snow & Co.  
Attorneys

THE NORRIS PETERS CO., PHOTO-LITHO., WASHINGTON, D. C.

UNITED STATES PATENT OFFICE.

CHARLES C. CRAGO, OF CENTREVILLE, IOWA.

GUARD FOR SHOVELS.

SPECIFICATION forming part of Letters Patent No. 661,287, dated November 6, 1900.

Application filed May 15, 1900. Serial No. 16,797. (No model.)

*To all whom it may concern:*

Be it known that I, CHARLES C. CRAGO, a citizen of the United States, residing at Centreville, in the county of Appanoose and State of Iowa, have invented a new and useful Guard for Shovels, of which the following is a specification.

The invention relates to improvements in guards for shovels.

One object of the present invention is to improve the construction of attachments for shovels and to provide a simple, inexpensive, and efficient device adapted to be applied to a metal shovel or scoop and adapted to form a guard to prevent the sharp edges of such a shovel or scoop from cutting, bruising, or otherwise injuring potatoes and the like in shoveling the same.

A further object of the invention is to provide a device of this character which may be readily detached for enabling the shovel to be used for other purposes.

The invention consists in the construction and novel combination and arrangement of parts hereinafter fully described, illustrated in the accompanying drawings, and pointed out in the claims hereto appended.

Figure 1:
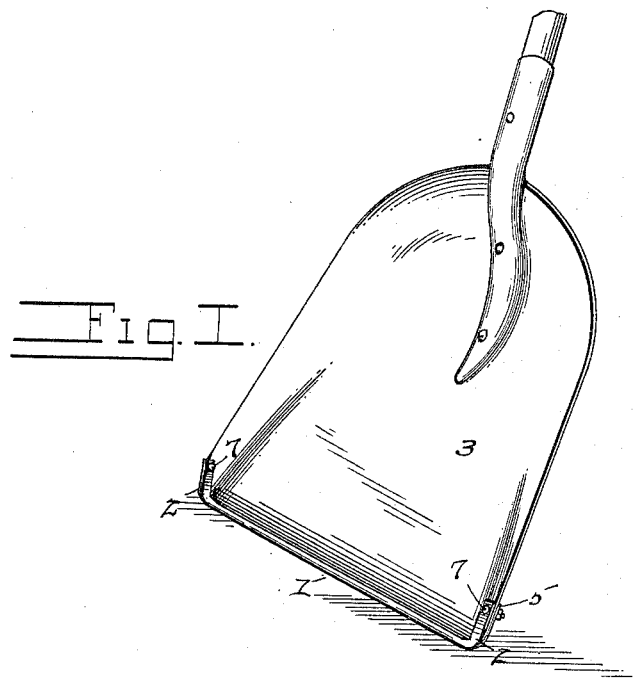
Figure 2:
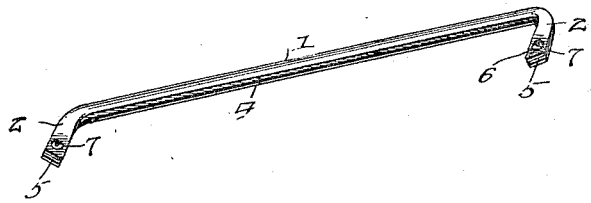
Figure 3:
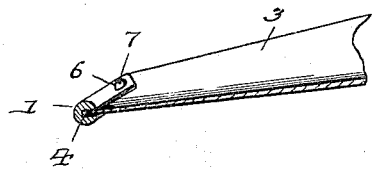

In the drawings, Figure 1 is a perspective view of a portion of a shovel provided with a guard constructed in accordance with this invention. Fig. 2 is a detail perspective view of the guard. Fig. 3 is a detail sectional view illustrating the manner of mounting the guard on the shovel.

Like numerals of reference designate corresponding parts in all the figures of the drawings.

1 designates a detachable guard consisting of a round rod having its terminals flattened and arranged at an angle to provide side arms 2, as clearly shown in Fig. 2 of the accompanying drawings. The round body portion of the guard extends across the front of the shovel-blade 3, and it is provided with a longitudinal groove 4, receiving the front edge of the shovel, and it forms a rounded surface or bead at the upper and lower faces of the shovel to prevent it from injuring potatoes and other vegetables and to enable it to slide freely over the supporting-surface. The arms 2, which are located at opposite sides of the shovel and which may extend any distance along the side edges thereof, are provided with slots or bifurcations 5 to receive the blade of the shovel, and the upper and lower portions of the arms lie upon the upper and lower faces of the blade of the shovel and are provided with perforations 6, which register with corresponding perforations of the shovel-blade. The guard is secured to the shovel-blade by means of fastening devices 7 passing through the said perforations and preferably consisting of bolts having their heads at the upper faces of the arms and provided at the back of the shovel with nuts. The bolts are adapted to be readily removed from the guard and the shovel to permit the former to be readily taken off of the latter. By securing the guard to the blade of the shovel in this manner the front edge of the shovel is securely retained within the longitudinal groove of the body portion of the guard, and the latter projects above and below the front and rear faces of the blade, as clearly shown in Fig. 3.

It will be seen that the guard is exceedingly simple and inexpensive in construction, that it is adapted to be readily applied to and removed from a shovel, and that it forms a bead or rib around the front edges of the said shovel to prevent the same from cutting or otherwise injuring potatoes and other vegetables in handling the same. It will also be apparent that the rounded lower face of the guard enables the shovel to slide freely over the floor or other supporting-surface and that it does not impair the effectiveness of the shovel for other purposes, as it may be quickly removed therefrom. This ability of the shovel to slide freely and smoothly over surfaces especially adapts it for conveniently handling such material as coal, as it will not catch on the rough bottoms of wagon-beds, cars, and the like, and the shovel may also be advantageously employed in handling grain, and it will not knock the corn from the cob to the same extent as an ordinary scoop.

What is claimed is—

1. A shovel having a metal blade and provided with a guard consisting of a round rod arranged at and receiving the front edge of the metal blade and forming a rounded bead at both the front and rear faces of the said blade, whereby the shovel is enabled to slide freely over rough surfaces and is prevented from injuring the material handled, substantially as described.

2. A detachable guard for shovels consisting of a round rod having its terminals bent at an angle to form arms, the body portion of the rod being grooved to receive the front edge of a shovel, and the arms being slotted to receive the side edges of the shovel and perforated for the reception of fastening devices, substantially as described.

In testimony that I claim the foregoing as my own I have hereto affixed my signature in the presence of two witnesses.

CHARLES C. CRAGO.

Witnesses:
 THOMAS GOSS,
 M. ALLBURR.